United States Patent [19]

Wilhelm et al.

[11] 3,761,546

[45] Sept. 25, 1973

[54] METHOD OF MAKING URANIUM DIOXIDE BODIES

[75] Inventors: Harley A. Wilhelm; James K. McClusky, both of Ames, Iowa

[73] Assignee: The United States of America as represented by the United States Atomic Energy Commission, Washington, D.C.

[22] Filed: May 22, 1972

[21] Appl. No.: 255,603

[52] U.S. Cl............. 264/0.5, 252/301.1 R, 423/261
[51] Int. Cl............................................. C01g 43/02
[58] Field of Search............................ 252/301.1 R; 264/0.5; 423/261

[56] References Cited
UNITED STATES PATENTS

| | | | |
|---|---|---|---|
| 3,094,377 | 6/1963 | Langrod.............................. | 423/261 |
| 3,462,371 | 8/1969 | Robertson..................... | 252/301.1 R |
| 3,536,793 | 10/1970 | Norman et al...................... | 264/0.5 |
| 3,641,227 | 2/1972 | Horsley et al....................... | 264/0.5 |
| 3,320,179 | 5/1967 | Gens............................ | 252/301.1 S |

OTHER PUBLICATIONS

Belle, "Uranium Dioxide: Properties and Nuclear Applications," 1961, USAEC Published, pp. 73–74

Primary Examiner—Carl D. Quarforth
Assistant Examiner—R. L. Tate
Attorney—Roland A. Anderson

[57] ABSTRACT

Sintered uranium dioxide bodies having controlled density are produced from $U_3O_8$ and carbon by varying the mole ratio of carbon to $U_3O_8$ in the mixture, which is compressed and sintered in a neutral or slightly oxidizing atmosphere to form dense slightly hyperstoichiometric uranium dioxide bodies. If the bodies are to be used as nuclear reactor fuel, they are subsequently heated in a hydrogen atmosphere to achieve stoichiometry. This method can also be used to produce fuel elements of uranium dioxide — plutonium dioxide having controlled density.

7 Claims, No Drawings

METHOD OF MAKING URANIUM DIOXIDE BODIES

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to a method for making uranium dioxide bodies. More specifically, this invention relates to a method for controlling the sintered density of uranium dioxide bodies.

One of the major problems of the atomic energy industry is the development of a fuel which can withstand the high temperatures projected for the reactors of the future. It is generally not possible to get the desired performance from known fuels due to the dimensional instability of the fuels. Evidence is readily available which shows that at a relatively low temperature, i.e., 500° to 1,100° C., uranium dioxide fuels grow at a rate of about 0.6 to 0.8 volume percent per $10^{20}$ fissions per $cm^3$. This growth or swelling is attributed to the formation of two fission products in the lattice of the solid fuel for each fission event. Many of these fission products are formed as gases which accumulate as tiny bubbles in the fuel. These bubbles are initially formed at high pressures and the rate at which they swell is a function of the temperature and strength of the fuel. At still higher temperatures, gas mobility increases sufficiently that, after a large amount of swelling has occurred, gas generation is balanced by gas release and swelling slows or ceases. One means for eliminating at least a part of the swelling problem is to provide porosity by decreasing the density of the fuel so that the fission gases can readily escape into built-in void spaces in the fuel element before they can damage the fuel element by causing it to swell.

One method currently employed commercially to control the density so as to thus provide internal porosity within the uranium dioxide fuel is to mix uranium dioxide powder having high ceramic activity with uranium dioxide powder of low ceramic activity before compacting and sintering the powders. The term "ceramic activity" refers to a uranium dioxide preparation which sinters readily to high density. Such material is then called an "active" oxide. By this method fuel which is less dense than is normally attainable with the use of the "active" form of uranium dioxide alone can be produced. However, by this method it is difficult to obtain reproducible results and difficult to control the degree and uniformity of the porosity due to differing ceramic "activities" of the forms of uranium dioxide making up the mixture. In addition, the "active" form which is usually very finely divided hyperstoichiometric uranium dioxide is highly pyrophoric and must be handled very carefully. This "active" form can be made somewhat passive and still retain its sinterability. However, variables in the preparation, in the storing and in the passive treatment of the "active" oxide often result in variable oxygen-to-uranium ratios. Since the sinterability of the oxide depends on the degree of fineness of the oxide and on this oxygen-to-uranium ratio in the green compacted oxide, undesirable variations in sintered densities of the final oxide can result.

Shapes of this material are also useful as crucibles and the like where high temperatures and inertness to certain chemical reactions are important.

SUMMARY OF THE INVENTION

We have developed a method for making sintered uranium dioxide bodies and shapes, which can also be used in fuel elements, in which the final sintered density of the uranium dioxide is controlled by mixing $U_3O_8$ with a predetermined amount of carbon to form a charge, the amount of carbon being determined by the final density desired, pressing the charge into a green body and heating the green body in an inert or slightly oxidizing atmosphere whereby the $U_3O_8$ is reduced to hyperstoichiometric uranium dioxide and sintered to the desired density. This produces a body useful wherever stoichiometry of the uranium dioxide is not important.

If the sintered body is to be used as a nuclear reactor fuel, the body may be heated in a hydrogen atmosphere to reduce the hyperstoichiometric uranium dioxide to stoichiometric uranium dioxide.

This method is also useful in preparing mixed oxide fuel of uranium dioxide and plutonium dioxide which is presently the projected fuel for the first generation liquid metal fast breeder reactor.

It is one object of this invention to produce dense uranium dioxide bodies.

It is another object of this invention to provide a method for producing uranium dioxide bodies having controlled density.

It is still a further object of this invention to provide a method for controlling the density of uranium dioxide bodies.

It is still a further object of this invention to provide a method for producing sintered uranium dioxide bodies having controlled density in the range from about 77 to 94 percent of the theoretical density.

It is another object of this invention to provide a method of producing sintered uranium dioxide bodies for use as nuclear reactor fuel.

It is still another object of this invention to provide a method for controlling the density of sintered uranium dioxide bodies for use in nuclear reactor fuel elements without requiring a ceramically active form of uranium dioxide as a starting material.

Finally, it is the object of this invention to provide a method for controlling the density of uranium dioxide — plutonium dioxide bodies for use in nuclear reactor fuel elements.

DESCRIPTION OF THE PREFERRED EMBODIMENT

These and other objects of the invention may be met by mixing carbon with $U_3O_8$ in a mole ratio of from 0.1 to 1.0 mole of carbon to 1 mole of $U_3O_8$ to form a charge, the amount of carbon depending upon the final density of uranium dioxide which is desired in the fuel or compact, compressing the charge into a green body at a pressure of at least about 10,000 lbs/in² and slowly heating the green body in an inert or slightly oxidizing atmosphere to a temperature above about 1,200° C. and maintaining this temperature for a period of time sufficient to sinter the body, thereby first reducing the $U_3O_8$ to hyperstoichiometric uranium dioxide, and sintering the body to the desired density. If the sintered body is to be used as a nuclear reactor fuel, it may be subsequently heated in a hydrogen atmosphere to reduce the hyperstoichiometric uranium dioxide to stoichiometric uranium dioxide.

As used herein, uranium dioxide will refer to hyperstoichiometric uranium dioxide unless it is stated that it has been reduced, in which case it will be stoichiometric or hypostoichiometric.

The hyperstoichiometric uranium dioxide as described herein has the formula $UO_{2.x}$, where $x =$ about 0.05 to 0.6. The amount of $x$ depends upon the amount of carbon which is mixed with the $U_3O_8$ before the mixture is reduced. Thus, where no carbon is present, the $U_3O_8$ will reduce to about $UO_{2.66}$ and when the mixture contains about 1 mole of carbon per mole of $U_3O_8$, the $U_3O_8$ will reduce to about $UO_{2.05}$. Uranium dioxide shapes having the greatest density are achieved with a mole ratio of about 0.7 mole carbon per mole of $U_3O_8$, which reduces to the uranium dioxide having the greatest "ceramic activity."

The charge is prepared by thoroughly mixing $U_3O_8$ and carbon. It is important that the $U_3O_8$ used in this method be finely divided so that it will be reduced to a uranium dioxide which is "active" or has a "high ceramic activity" if uranium dioxide bodies having a high sintered density are desired. When lower density sintered uranium dioxide bodies are desired, a less finely divided $U_3O_8$ may be used with a proper mole ratio of carbon to yield the uranium dioxide shape.

Finely divided $U_3O_8$ can be prepared by several methods using different starting materials. For example, production-grade $UO_3$ can be used as a starting material by mixing it with water and grinding to dissolve any water-soluble uranium compounds contained therein and to form a slurry. Excess ammonium hydroxide is added to precipitate any soluble uranium as ammonium diuranate (ADU), the water is removed and the $UO_3$ and ADU are heated at a low temperature to decompose the mixture to a $U_3O_8$ which is finely divided. Finely divided $U_3O_8$ can also be prepared by the thermal decomposition of ADU alone in air or by comminution of a coarse $U_3O_8$.

It is preferred that the carbon to be mixed with the $U_3O_8$ is in the form of powdered graphite which acts as a binder to hold the charge in the desired shape and also acts as a lubricant for the die. The mole ratio of carbon to $U_3O_8$ depends upon density requirements. In order to obtain the maximum density of uranium dioxide by this method, the mole ratio of carbon to $U_3O_8$ may range from 0.68 to 0.72 with a ratio of 0.70 preferred. Mixtures of $U_3O_8$ and carbon containing over about 1.0 mole of carbon will result in the presence of small amounts of carbon in the final compact by the heating procedure outlined here and will lower the final density. In Table I below are given a number of densities which were obtained by varying the mole ratio of carbon to $U_3O_8$. The sintered densities were obtained from charges containing $U_3O_8$ (obtained by the thermal decomposition of ADU in air) and graphite and were pressed at 31,000 lbs/in² and sintered in carbon dioxide for 2 hours at 1,400° C.

TABLE I

| Charge Composition in moles | Sintered Density g/cm³ | % of Theoretical Density of $UO_2$ |
|---|---|---|
| $U_3O_8 + 0.1$ C | 8.66 | 78.98 |
| $U_3O_8 + 0.3$ C | 10.04 | 91.50 |
| $U_3O_8 + 0.5$ C | 10.47 | 95.40 |
| $U_3O_8 + 0.7$ C | 10.51 | 95.81 |
| $U_3O_8 + 0.9$ C | 10.37 | 94.51 |

Although pressures of 31,000 lbs/in² were used to press the $U_3O_8$ — carbon charges into the desired shapes, pressures as low as 10,000 lbs/in² should be satisfactory.

The pressed compacts are sintered in an inert or slightly oxidizing atmosphere at temperatures above about 1,200° C. for a period of time sufficient to sinter the body. Although the maximum sintering time is not critical, the time does vary with the temperature. For example, it was found that a period of about 2 hours at a temperature of 1,400° C. was sufficient to obtain essentially the greatest density of each composition and sintering times of up to about 5 hours did not increase the final product density.

Although an inert atmosphere such as argon, helium or nitrogen will provide satisfactory densities, the use of an atmosphere which is slightly oxidizing such as carbon dioxide is preferred because the stoichiometry of the uranium oxide is more nearly optimized and maintained as temperature increases and the densities obtained therewith are slightly greater than are attainable in an inert atmosphere.

If the sintered body is to be used in a reactor fuel element, it will be necessary to completely reduce the uranium dioxide to $UO_{2.00}$, since the uranium oxide, after sintering, is generally slightly hyperstoichiometric. This is readily accomplished by subsequently heating the body in a hydrogen atmosphere at a temperature above about 1,200° C. a period of time sufficient to accomplish the reduction and cooling the body in the same atmosphere to prevent any pickup of oxygen from the air. It was found that about one-half hour at a temperature of about 1,400° C. was sufficient to complete the desired reduction.

EXAMPLE 1000 grams of production-grade uranium dioxide were dissolved in concentrated nitric acid ($HNO_3$) to yield a uranyl nitrate solution ($UO_2(NO_3)_2·6H_2O$) containing about 100 grams of uranium per liter of solution. This solution was then heated to about 60° C. and ammonium hydroxide ($NH_4OH$) added to precipitate the uranium as ammonium diuranate [$(NH_4)_2 U_2O_7$]. Enough ammonium hydroxide was added to completely precipitate all the uranium and increase the pH of the solution to about 9.0. After the ammonium diuranate was filtered, washed and dried, it was powderized and converted to $U_3O_8$ by heating in air at 800° C. Portions of this $U_3O_8$ were then used in subsequent sintering experiments.

Thirteen charges containing variable carbon to $U_3O_8$ mole ratios were first prepared. This was accomplished by thoroughly mixing 50 grams of $U_3O_8$ and enough carbon (graphite powder) to yield the desired carbon to $U_3O_8$ mole ratio. Table II includes a summary of the weights of oxide and carbon used in each charge and the resulting carbon to $U_3O_8$ mole ratio in each charge.

Next, green bodies were prepared by cold-pressing 6 to 7 grams from each charge at 31,000 lbs/in² in a double-action steel die. These green bodies were then slowly heated in a carbon dioxide atmosphere through the reaction range up to about 900° C. and further heated to 1,400° C. and held at this temperature for 2 hours. A body prepared from the same $U_3O_8$ with no carbon addition was pressed and sintered at the same time and served as a blank. In order to reduce the O/U ratio in the sintered compacts to 2.0, an additional 30 minutes of heating at 1,400°C. was carried out using hydrogen as the atmosphere. To maintain the O/U ratio at 2.0, the sintered and reduced bodies were then cooled to room temperature in hydrogen.

TABLE II

| Sample No. | Wt. of $U_3O_8$ used | Wt. of carbon used | $C/U_3O_8$ ratio | Final $UO_{2.00}$ Sintered Density % of Theoretical |
|---|---|---|---|---|
| Blank | 50 grams | 0.0 | 0.0 | 73.88 |
| 1 | " | 0.071 g | 0.177 | 00.00 |
| 2 | " | 0.143 g | 0.280 | 00.00 |
| 3 | " | 0.214 g | 0.383 | 20.00 |
| 4 | " | 0.285 g | 0.486 | 25.00 |
| 5 | " | 0.356 g | 0.589 | 37.00 |
| 6 | " | 0.428 g | 0.692 | 25.00 |
| 7 | " | 0.499 g | 0.793 | 80.00 |
| 8 | " | 0.570 g | 0.893 | 25.00 |
| 9 | " | 0.642 g | 0.992 | 50.00 |
| 10 | " | 0.713 g | 1.091 | 80.00 |
| 11 | " | 0.784 g | 1.190 | 70.00* |
| 12 | " | 0.856 g | 1.290 | 30.00* |
| 13 | " | 0.927 g | 1.390 | 00.00* |

*These compacts also contained residual carbon.

The untreated $U_3O_8$ yielded a final sintered density of about 74 percent of theoretical. Increasing the carbon to $U_3O_8$ mole ratio through 0.7, in 0.1 mole increments, produced subsequent increases in the final sintered densities. Charges with carbon to $U_3O_8$ mole ratios above 0.7, however, yielded successively lower sintered densities. Sintered compacts prepared from charges containing carbon to $U_3O_8$ mole ratios of greater than 1.0 would appear to have no significant application since residual carbon was present after sintering. However, higher sintering temperatures with vacuum after the 1,400° C. treatments could yield hypostoichiometric uranium dioxide with these compositions.

As can be seen, the process of this invention provides a method for producing uranium dioxide bodies in which the final density of the bodies can be readily controlled from about 77 percent to about 94 percent of theoretical density. Greater porosities can also be achieved by substituting a coarser form of $U_3O_8$ for some of the $U_3O_8$ used in the above example.

The method of this invention is also readily adaptable to preparing mixed oxide compacts of plutonium dioxide and uranium dioxide by addition of the desired amount of plutonium dioxide to the carbon — $U_3O_8$ while maintaining the same carbon to $U_3O_8$ ratio.

It will be understood that the invention is not to be limited to the details given herein but that it may be modified within the scope of the appended claims.

We claim:

1. A method of making a uranium dioxide body having controlled final density of from about 77 to about 94 percent of the theoretical density comprising: mixing finely divided $U_3O_8$ with a predetermined amount of carbon to prepare a charge, the amount of carbon varying from a ratio of 0.1 to 1.0 moles of carbon to 1 mole of $U_3O_8$ and being determined by the final density desired; pressing the charge into a green body; and heating the green body in an inert or slightly oxidizing atmosphere to a temperature of from about 1,200° to about 1,500° C. until the $U_3O_8$ is reduced to hyperstoichiometric uranium dioxide and sintered, thereby forming a uranium dioxide body having controlled density.

2. The method of claim 1 wherein the carbon is graphite and the $U_3O_8$ and graphite charge is pressed at a pressure of at least 10,000 lbs/in² to form a green body.

3. The method of claim 2 wherein the atmosphere is selected from the group consisting of argon, helium, nitrogen and carbon dioxide.

4. The method of claim 1 comprising the additional step of heating the uranium dioxide body in a hydrogen atmosphere, thereby completely reducing the body to stoichiometric uranium dioxide.

5. The method of claim 4 wherein the body is heated to a temperature above about 1,000° C. for a period of time sufficient to reduce the body to stoichiometric uranium dioxide.

6. The method of claim 5 wherein the body also contains plutonium dioxide.

7. A method of making a uranium dioxide body for use in a fuel element wherein the body has a controlled final density of from about 77 to about 94 percent of the theoretical density comprising: mixing $U_3O_8$ with graphite in a ratio of 0.1 to 0.7 mole graphite to 1 mole of $U_3O_8$ to form a charge; the amount of graphite in the charge being determined by the desired final density; pressing the charge into a green body; heating the green body in a carbon dioxide atmosphere up to a temperature of 1,350° to 1,500° C. for at least 2 hours whereby the $U_3O_8$ is reduced to hyperstoichiometric uranium dioxide and sintered; and heating the sintered body under a hydrogen atmosphere at a temperature of 1,350° to 1,500° C. for at least one-half hour, whereby said hyperstoichiometric uranium dioxide is reduced to stoichiometric uranium dioxide, thereby forming a uranium dioxide fuel element having controlled density.

* * * * *